United States Patent Office 3,560,577
Patented Feb. 2, 1971

3,560,577
PROCESS FOR MAKING REACTION PRODUCTS OF NITROUS ACID AND 1,3-DICHLOROBUTENE-2 OR DIISOBUTYLENE
Edwin Benjamins, Montague, Mich., assignor to E. I. du Pont de Nemours and Company, Wilmington, Del.
No Drawing. Filed Sept. 18, 1968, Ser. No. 760,695
Int. Cl. C07c *81/00, 81/02*
U.S. Cl. 260—647                  4 Claims

ABSTRACT OF THE DISCLOSURE

Reaction products of nitrous acid and 1,3-dichlorobutene-2 or diisobutylene, useful as inhibitors of "popcorn" polymer formation in chloroprene polymerization reactions, are made by a controllable process comprising (1) adding an alkali or alkaline earth metal nitrite to liquid 1,3-dichlorobutene-2 or diisobutylene with agitation, (2) slowly adding concentrated hydrochloric or sulfuric acid to the mixture so obtained, and (3) recovering a reaction product of nitrous acid and 1,3-dichlorobutene-2 or diisobutylene from the by-product alkali or alkaline earth metal salt formed.

BACKGROUND OF THE INVENTION

In the manufacture of elastomeric polymers, and especially of such chlorobutadienes as 2-chloro-1,3-butadiene (chloroprene), unwanted granular polymers form during distillation and storage. These polymers, known as "popcorn" polymers because they resemble popped corn, are formed by the spontaneous polymerization of monomers in the system. So-called "seeds" are formed which act as sites for further polymerization, leading to a build-up of the "popcorn" polymer. Some of the seeds become attached to the process and handling equipment and cannot be readily removed by mechanical means; moreover, being insoluble in most common solvents, they are virtually impossible to wash out. Even after the equipment has been cleaned as thoroughly as possible, residual particles remain and promote the unwanted polymer growth. Popcorn polymerization causes loss of valuable raw material and significantly increases the overall cost of production by clogging pipes, condensers and other equipment.

Gaseous nitrogen dioxide has been used to prevent the growth of granular polymer seeds in butadiene refining systems and has been found to stabilize chloroprene against popcorn growth. Unfortunately, nitrogen dioxide sometimes produces unstable, explosive products and thus presents a serious safety hazard. Compounds such as those disclosed in Morrell et al. U.S. Pat. 2,483,778, which have been proposed for preventing granular polymer formation in butadienes, have been found either to have little or no value in preventing growth of the unwanted polymers in the chloro-1,3-butadiene systems or to interfere with the desired elastomer polymerization.

Avoidance of the formation of granular polymers of chloroprene (first described by Carothers et al. J.A.C.S. 53, 4205 (1931), who called them "omega polymers") during manufacture of desired chloroprene polymers is a serious problem and so far has been only partly solved. The presence of small amounts of the addition product of 1,3-dichloro-2-butene and nitrogen dioxide made as described in Hively U.S. Pat. 2,770,657 is effective, for both 2-chloro- and 2,3-dichlorobutadienes, but contributes an odor to the plastic polymers made from monomers thus stabilized, and the process of making the inhibitor is sometimes uncontrollable. Ion-exchange resins containing nitrite ions as describing in Norton U.S. Pat. 2,842,602 are effective as popcorn inhibitors, but such resins are insoluble solids and therefore difficult to handle in the polymerization reaction. Butyraldoxime, used as described in Keown U.S. Pat. 2,947,795 for stabilizing monovinylacetylene, is also effective for 2-chloro-1,3-butadiene, but has the disadvantage of also retarding its polymerization to the desired plastic polymers.

Stabilization of chlorobutadiene monomers with nitrogen tetroxide-diisobutylene addition products is the subject of Colbert U.S. Pat. 3,175,012. A chloroprene monomer from the group of 2-chloro-1,3-butadiene and 2,3-dichloro-1,3-butadiene is stabilized against the formation of granular polymers by incorporating therein 5 to 200 parts of the addition product per million parts by weight of the monomer. The addition product is made by reaction of nitrogen tetroxide and diisobutylene, the latter being 2,4,4-trimethyl-1-pentene or 2,4,4-trimethyl-2-pentene, or mixtures of the two.

SUMMARY OF THE INVENTION

Now according to the present invention it has been found that the above-discussed problems of prior chloroprene popcorn polymer inhibitors can be avoided and highly effective inhibitors can be safely produced, by processes comprising the steps of (1) adding a nitrite of an alkali or alkaline earth metal to liquid 1,3-dichlorobutene-2 or diisobutylene with agitation, (2) slowly adding concentrated hydrochloric acid or sulfuric acid to the mixture so obtained, and (3) recovering a reaction product of nitrous acid and the 1,3-dichlorobutene-2 or diisobutylene from the by-product alkali or alkaline earth metal salt formed.

DESCRIPTION OF THE PREFERRED EMBODIMENTS

For convenience, the reaction products of processes of the present invention will herein sometimes be referred to as "nitrosates."

As the nitrite used in the novel processes one may select an alkali metal nitrite, i.e. sodium, potassium or lithium nitrite, or an alkaline earth metal nitrite, i.e. calcium, strontium or barium nitrite. The alkali metal nitrites are preferred, especially sodium nitrite. Ordinarily the nitrite will be in granular or powdered form, and will be added continuously or in increments as the reaction progresses. Effective agitation is provided during addition.

The nitrite is added to liquid 1,3-dichlorobutene-2 or diisobutylene. Either of these is readily available commercially. The rate of addition is unimportant but advantageously is such as to provide a suspension of the nitrite in the selected reactant with the agitation available.

When the nitrite has been added the slow addition of a mineral acid, selected from hydrochloric acid or sulfuric acid is started. The most concentrated acids commercially available can be used—for example, 37% hydrochloric acid or 98% sulfuric acid, but acids of lesser concentration can also be employed. If the acid is concentrated the salt formed in the reaction will precipitate out and can easily be settled out and thus separated from the product. The proportion of acid to use in respect to the nitrite should be that which is stoichiometrically equivalent to the nitrite to form nitrous acid. With sodium nitrite and hydrochloric acid, for instance, the equation is:

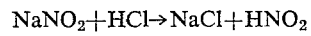

$$NaNO_2 + HCl \rightarrow NaCl + HNO_2$$

The proportions of acid and nitrite (i.e. of $HNO_2$) to use, relative to the 1,3-dichlorobutene-2 or diisobutylene should be such as to provide from 5% to 30% of combined $NO_2$ by weight in the final product. The $NO_2$ remains in the product quantitatively during the reaction if the rate addition of the acid is suitably slow and the temperature of the reaction medium is not permitted to exceed about 35° C. to permit a higher rate of acid addition it is advantageous to provide external cooling, although solutions having a nitrosate content up to 30% have been prepared without external cooling.

A blue color develops as the reaction proceeds, and this color is proportional to the concentration of nitrosate product in the solution. Its intensity can therefore be used as an indicator with which to gauge the progress of the reaction and measure the percentage of combined $NO_2$.

When the combined $NO_2$ in the mixture has risen to the desired percentage the nitrosate product is recovered from the by-product salt. If the nitrite used is sodium nitrite and the acid used is hydrochloric, the by-product salt will, of course, be sodium chloride. If the acid used was sufficiently concentrated this sodium chloride will be present in solid form and the nitrosate can simply be drained away from the settled solids. If the acid was somewhat less concentrated—say 20% HCl, the salt will be present as a brine and the nitrosate can be recovered by gravitational separation methods such as centrifugation.

The described process for carrying out the nitrosation reaction has improved utility in that it is safer to use than methods heretofore proposed. The reaction proceeds at a controllable rate and is not subject to the fires and explosions sometimes encountered in prior art processes.

The recovered nitrosate product has a high order of effectiveness in inhibiting popcorn polymerization of diene-type monomers and especially of such chlorobutadienes as 2-chloro-1,3-butadiene. The nitrosate is merely added to and mixed with the monomer in an effective amount. From about 10 to 1000 parts per million of nitrosate in the monomer have been found to be practical in 2-chloro-1,3-butadiene monomer, but the optimum amount can readily be determined by trial and error in specific cases. Elevated temperatures and prior contamination by popcorn polymer of handling and storage equipment tend to cause increased popcorn formation and call for larger amounts of inhibitor, as does the presence of iron rust.

The invention will be better understood by reference to the following illustrative examples:

EXAMPLE 1

To 100 cc. of 1,3-dichlorobutene-2 was added 15 gm. of granular sodium nitrite with agitation. Thereafter the agitation was continued and 5 cc. of concentrated sulfuric acid (98% by weight $H_2SO_4$) was added at a drop-wise rate. A blue color developed in the reaction medium indicating a high concentration of nitrosate product.

EXAMPLE 2

The procedure of Example 1 was repeated, using 15 cc. of concentrated hydrochloric acid (37.5% HCl by weight) in place of the 5 cc. of sulfuric acid. The development of a strong blue color indicated formation of the nitrosate product.

EXAMPLE 3

A nitrosate reaction product was prepared by adding 40 grams of granular sodium nitrite to 200 grams of 1,3-dichlorobutene-2 and, while stirring vigorously, dropping concentrated hydrochloric acid (37.5% HCl) into the dichlorobutene. The $NO_2$ content of the nitrosate formed, as indicated by the development of blue color, increased proportionately to the acid added. It appeared that all the nitrite had been consumed when 40 cc. of acid had been added.

The acid dropping rate was maintained sufficiently slow that oxides of nitrogen were not evolved, and hence were not lost, from the reaction mixture. The total time of acid addition was about 1¾ hours. No appreciable heat was evolved. From known standards it appeared that the $NO_2$ in sodium nitrite as used in the instant processes is 50% more efficient than gaseous $N_2O_4$ in producing the blue nitrosate 1,3-dichlorobutene-2 reaction product.

EXAMPLE 4

The procedure of Example 3 was repeated except that 100 cc. of diisobutylene was substituted for the 1,3-dichlorobutene-2. The characteristic blue color of the nitrosate product developed as the reaction progressed. The reaction was easily controllable and almost no heat was generated.

EXAMPLE 5

Into each of eight 12 oz. clear glass bottles was placed 100 cc. of chloroprene monomer containing 100 parts per million of p-tertiary-butylcatechol. One gram of popcorn polymer was added to each bottle as seed; no inhibitor was added to the first two bottles; 1000 p.p.m. of 1,3-dichlorobutene-2 nitrosate made from gaseous $N_2O_4$ according to Hively Pat. 2,770,657 was added to bottles 3 and 4; 1000 p.p.m. of 1,3-dichlorobutene-2 nitrosate made according to a process of Example 3 hereinabove was added to bottles 5 and 6; and 1000 p.p.m. of 1,3-dichlorobutene-2 nitrosate made using sulfuric acid according to a process of Example 1 hereinabove was added to bottles 7 and 8.

After standing 2 days at room temperature (68° F.) the first two bottles contained a large proportion of popcorn polymer. The remaining bottles contained no evidence of new popcorn formation.

The foregoing experiment was repeated as to bottles 5 and 6, but using 50 p.p.m. of the inhibitor. After the bottles had stood for 17 hours at 40° C. it was observed that popcorn polymer formation had been substantially retarded as compared with similar bottles containing no inhibitor.

I claim:

1. In a process for producing a nitrosate reaction product of an organic compound selected from the group consisting of 1,3-dichlorobutene-2 and diisobutylene, said nitrosate being an effective inhibitor of popcorn polymer formation in chloroprene polymerization reactions, the steps comprising (1) adding an alkali metal nitrite or an alkaline earth metal nitrite to a said selected compound, (2) slowly adding, with agitation, a concentrated mineral acid selected from the group consisting of hydrochloric and sulfuric acid to the mixture so obtained, and (3) recovering a reaction product of nitrous acid and said selected organic compound from the by-product alkali metal salt or alkaline earth metal salt so formed.

2. A process of claim 1 wherein the proportions of selected organic compound, metal nitrite and concentrated acid are chosen to provide about from 5 to 30% by weight of combined $NO_2$ in the nitrosate product.

3. A process of claim 1 wherein the rate of acid addition is below that at which free $NO_2$ is evolved from the reaction medium.

4. A process of claim 1 in which the concentration of acid is sufficiently high that the by-product salt formed in the reaction deposits from the reaction medium, and the nitrosate product is recovered by settling out said deposited salt.

References Cited

UNITED STATES PATENTS 3,379,710    4/1968    Ellis _____ 260—647X

LELAND A. SEBASTIAN, Primary Examiner

U.S. Cl. X.R.

260—92.3, 655